(12) United States Patent
Bhatia et al.

(10) Patent No.: US 9,848,089 B2
(45) Date of Patent: Dec. 19, 2017

(54) METHODS AND APPARATUS TO GENERATE AN OVERALL PERFORMANCE INDEX

(71) Applicant: The Nielsen Company (US), LLC, Schaumburg, IL (US)

(72) Inventors: Rohit Bhatia, San Mateo, CA (US); Amilcar Pérez, Schaumburg, IL (US); Michael Greenawald, Carmel, IN (US); Kunal Barai, Lynchburg, VA (US); Joel Ullmann, Oakland, CA (US); Austin Albino, San Francisco, CA (US)

(73) Assignee: The Nielsen Company (US), LLC, New York, NY (US)

( * ) Notice: Subject to any disclaimer, the term of this patent is extended or adjusted under 35 U.S.C. 154(b) by 210 days.

(21) Appl. No.: 14/701,235

(22) Filed: Apr. 30, 2015

(65) Prior Publication Data

US 2016/0127921 A1    May 5, 2016

Related U.S. Application Data

(60) Provisional application No. 62/075,362, filed on Nov. 5, 2014.

(51) Int. Cl.
*H04W 4/24* (2009.01)
*H04M 15/00* (2006.01)
*H04W 24/10* (2009.01)

(52) U.S. Cl.
CPC .......... *H04M 15/58* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 5,255,309 | A | 10/1993 | Katz |
| 6,470,079 | B1 | 10/2002 | Benson |
| 6,754,470 | B2 | 6/2004 | Hendrickson et al. |
| 6,857,024 | B1 | 2/2005 | Chen et al. |
| 6,928,280 | B1 | 8/2005 | Xanthos et al. |
| 6,977,997 | B2 | 12/2005 | Shioda et al. |

(Continued)

FOREIGN PATENT DOCUMENTS

CN    101425935    5/2009

OTHER PUBLICATIONS

United States Patent and Trademark Office, "Advisory Action," issued in connection with U.S. Appl. No. 14/138,907, dated May 29, 2015 (5 pages).
United States Patent and Trademark Office, "Notice of Allowance," issued in connection with U.S. Appl. No. 14/138,907, dated Jun. 30, 2015 (6 pages).

(Continued)

*Primary Examiner* — Daniel Lai
*Assistant Examiner* — Frank Donado
(74) *Attorney, Agent, or Firm* — Hanley, Flight & Zimmerman, LLC

(57) ABSTRACT

Methods, apparatus, systems and articles of manufacture are disclosed to generate an overall performance index. The overall performance index is generated from data values from multiple different datasources that measure the same aspect of network performance of wireless providers of interest. The data values are used to generate metrics that measure the same aspect of network performance. The metrics are indexed and combined to generate an overall performance index.

30 Claims, 7 Drawing Sheets

(56) References Cited

U.S. PATENT DOCUMENTS

| | | | |
|---|---|---|---|
| 8,285,218 | B2 | 10/2012 | Papakostas et al. |
| 8,300,797 | B1 | 10/2012 | Benesh et al. |
| 8,311,880 | B1 | 11/2012 | Zabriskie et al. |
| 8,527,328 | B2 | 9/2013 | Grace et al. |
| 8,688,053 | B2 | 4/2014 | Papakostas et al. |
| 8,843,385 | B2 | 9/2014 | Jurca et al. |
| 2002/0116124 | A1 | 8/2002 | Garin et al. |
| 2002/0116460 | A1 | 8/2002 | Treister et al. |
| 2002/0147980 | A1 | 10/2002 | Satoda |
| 2002/0191762 | A1 | 12/2002 | Benson |
| 2005/0138529 | A1 | 6/2005 | Thorell et al. |
| 2006/0120451 | A1 | 6/2006 | Hannuksela |
| 2006/0217116 | A1 | 9/2006 | Cassett et al. |
| 2007/0004394 | A1* | 1/2007 | Chu .............. H04W 24/08 455/422.1 |
| 2007/0140451 | A1 | 6/2007 | Altberg et al. |
| 2007/0160185 | A1 | 7/2007 | Taylor et al. |
| 2007/0243881 | A1* | 10/2007 | Roskowski .......... H04W 24/00 455/456.1 |
| 2008/0144563 | A1* | 6/2008 | Hart .............. H04B 7/18584 370/316 |
| 2008/0313033 | A1 | 12/2008 | Guo et al. |
| 2009/0064248 | A1 | 3/2009 | Kwan et al. |
| 2009/0104915 | A1 | 4/2009 | Katis et al. |
| 2010/0015926 | A1 | 1/2010 | Luff |
| 2014/0066052 | A1* | 3/2014 | Chang .............. H04L 43/08 455/423 |
| 2014/0113620 | A1 | 4/2014 | Papakostas et al. |
| 2014/0153419 | A1* | 6/2014 | Beattie, Jr. ........... H04W 24/10 370/252 |
| 2014/0226799 | A1 | 8/2014 | Aggarwal et al. |
| 2014/0226800 | A1 | 8/2014 | Aggarwal et al. |
| 2014/0229236 | A1 | 8/2014 | Aggarwal et al. |
| 2014/0229614 | A1 | 8/2014 | Aggarwal et al. |

OTHER PUBLICATIONS

United States Patent and Trademark Office, "Non-Final Office Action," issued in connection with U.S. Appl. No. 12/550,752, dated Feb. 22, 2012 (16 pages).

United States Patent and Trademark Office, "Notice of Allowance," issued in connection with U.S. Appl. No. 12/550,752, dated Jun. 8, 2012 (7 pages).

Wikipedia, "Mean Opinion Score," Retrieved from the nternet: http://en.wikipedia.org/wiki/Mean_opinion_score, [retrieved on Apr. 1, 2009] (3 pages).

The State Intellectual Property Office of China. "First Notification of Office Action and Search Report," with English Translation, issued in connection with corresponding Chinese Application Serial No. 201010268716.1, dated Feb. 27, 2013 (11 pages).

United States Patent and Trademark Office, "Non-Final Office Action," issued in connection with U.S. Appl. No. 13/616,714, dated Apr. 16, 2013 (10 pages).

Intellectual Property Office of P.R. China, "Second Office Action," with English Translation, issued in connection with corresponding Chinese Application Serial No. 201010268716.1, dated Jul. 29, 2013 (5 pages).

United States Patent and Trademark Office, "Final Office Action," issued in connection with U.S. Appl. No. 13/616,714, dated Sep. 3, 2013 (14 pages).

United States Patent and Trademark Office, "Notice of Allowance," issued in connection with U.S. Appl. No. 13/616,714, dated Nov. 14, 2013 (9 pages).

United States Patent and Trademark Office, "Non-Final Office Action," issued in connection with U.S. Appl. No. 14/138,907, dated Dec. 3, 2014 (31 pages).

United States Patent and Trademark Office, "Final Office Action," issued in connection with U.S. Appl. No. 14/138,907, dated Mar. 18, 2015 (16 pages).

* cited by examiner

METHODS AND APPARATUS TO GENERATE AN OVERALL PERFORMANCE INDEX

RELATED APPLICATION

This patent claims the benefit of U.S. Provisional Application Ser. No. 62/075,362, which was filed on Nov. 5, 2014, and is hereby incorporated herein by reference in its entirety.

FIELD OF THE DISCLOSURE

This disclosure relates generally to network performance, and, more particularly, to methods and apparatus to generate an overall performance index.

BACKGROUND

In recent years, cellular carriers use network operations teams to optimize their cellular network performance. These teams are primarily interested in delivering the best network experience in a given market, and secondarily, in raising all of the carrier's markets to the same standard. The network operations teams use a variety of different datasources to optimize their cellular network performance.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
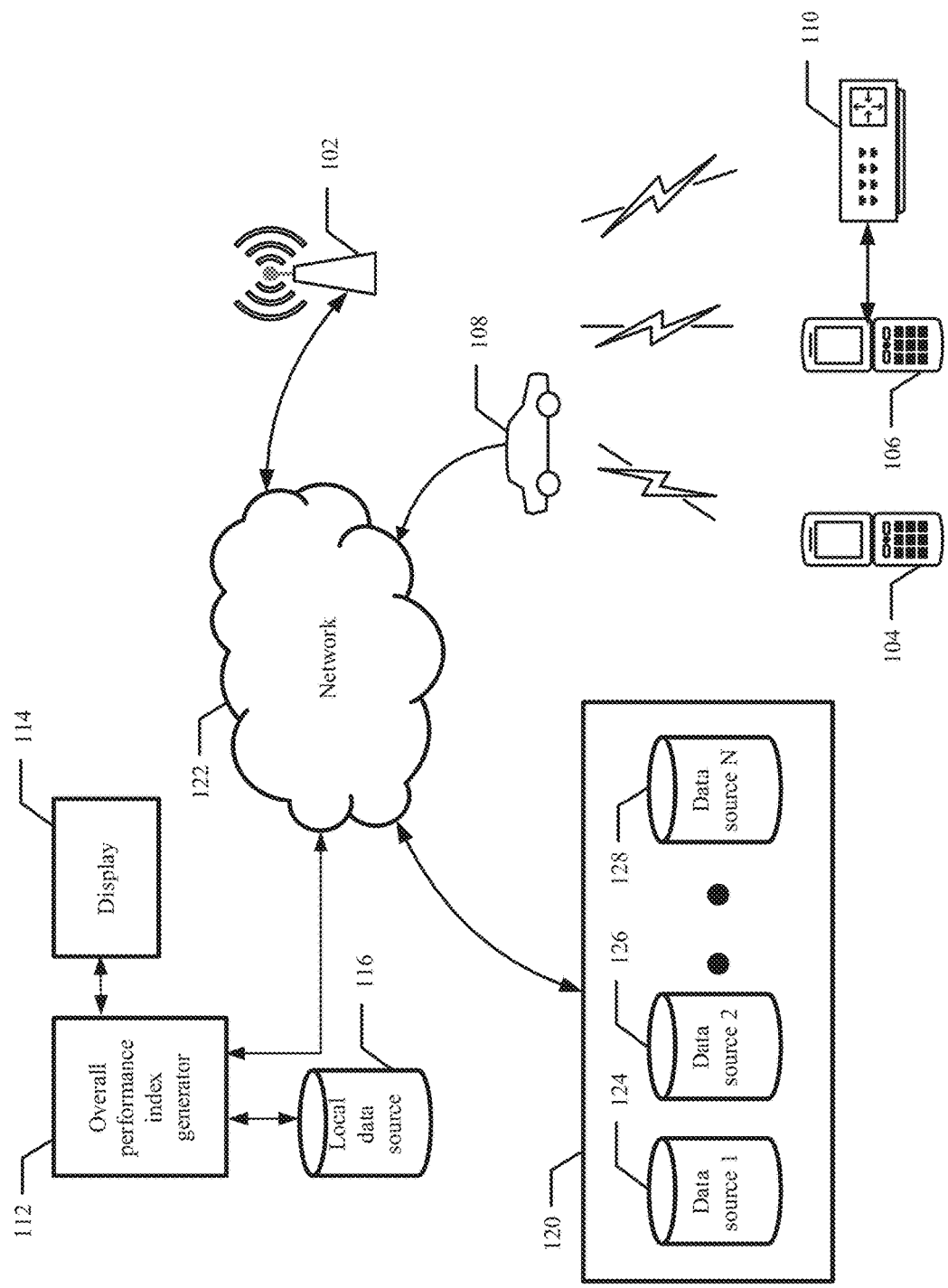
FIG. 1 is a diagram illustrating an example environment in which a system to generate an overall performance index operates.

A cellular carrier, also known as a wireless provider, use many sources of data to optimize its network performance. The datasources include the Nielsen Company's Customer Experience suites, the carrier's own internal network performance measurement datasources, network switching datasources, and other third party datasources. These different datasources may report on different aspects of the cellular carrier's network performance. Currently, there is no platform available that combines the different datasources into an overall metric or index that the carrier can use to compare its network performance with their network performance objectives and/or the performance of the carrier's competitors.

In one example, methods and apparatus to generate an overall performance index are disclosed below. The overall performance index allows carriers to compare network performance to peers in the market via normalized and indexed network performance metrics across various network performance objectives. The overall performance index will be aggregated at one or more geographic levels, for example at zip codes, or based on carrier site shape files. In some examples, only the geographic areas with a minimum number of data points will be calculated/reported.

In one example, the data from at least two network performance datasources will be combined to produce an overall performance index. In other examples more than two network performance datasources may be used to produce the overall performance index. A network performance datasource is a location, either physical or virtual, where the network performance data measured using a specific collection method is stored, for example a database or a product. A data set is the file or files that contain the data in the datasource.

In one example, the two network performance datasources that will be combined to produce an overall performance index are: Nielsen Drive Test (NDT) Data and Nielsen Mobile Performance Data.

Drive test data is collected using a specific collection method. Drive test data is collected by equipping vehicles with network performance measurement equipment, and driving the vehicles through various regions. During these drives, the equipment runs various tests of different network performance parameters, and collects the results of those tests. A Nielsen datasource that delivers this data is referred to as Nielsen Drive Test (NDT). Other sources of drive test data may exist.

An audience measurement company may enlist panelists (e.g., persons agreeing to have their media exposure habits monitored) to cooperate in an audience measurement study. The calling habits of these panelists as well as demographic data about the panelists is collected and used to statistically determine (e.g., project, estimate, etc.) the size and demographics of a larger viewing audience.

Mobile performance data is collected using a specific collection method. Mobile performance data is collected by a smartphone application (also known as a smartphone app), which is installed on panelists' smartphones. As the panelists use their smartphone in different locations, the app passively collects data on various aspects of network performance. This data is returned to a collection device for analysis. A Nielsen datasource that delivers this data is referred to as Nielsen Mobile Performance (NMP).

Metrics within the data sets are identified that describe the same network performance objective such as data reliability, voice reliability, data speed, voice quality, etc. These metrics for comparison within the various data sets may not be technically identical, but are rather metrics that describe the same aspect of the network performance experience.

In this example the metrics used to create the overall performance index from the two datasources are: Data reliability, Data throughput, passive data coverage, active data coverage and voice reliability. The metrics will be weighted and combined to create the overall performance index.

One example weighting approach assigns weights to each metric based on their impact on overall network satisfaction. This level of impact may be determined by running a Drivers Analysis on customer satisfaction survey data. A Drivers Analysis is a statistical analysis that is used to determine how certain metrics are influenced by other metrics. For example, overall Satisfaction of a customer could be influenced by several things like satisfaction with the quality of the cellular network, satisfaction with the data speeds, satisfaction with the price of the service, etc. A Drivers Analysis will help determine how big a role each of the factors plays in determining the Overall Satisfaction.

For satisfaction data, either Nielsen Mobile Insights, or NMP surveys may be used. Nielsen Mobile Insights is the largest survey of telecom customers in the U.S. As part of the NMP study, surveys are sent out to the panelists to determine satisfaction data.

Another example weighting approach assigns weights to each metric based on the frequency of that behavior by customer population (e.g. assign weights based on average number of calls/data requests that customers make in a given time period). The frequency of behavior by customer population can be obtained through the NMP data set, or other On Device Metering solutions (e.g., Nielsen Smartphone Analytics).

The weighted scores for each metric will be combined to form an overall performance index. In one example, the overall performance index will be calculated with a mean of 100 and a Standard Deviation (SD) of 20 for each performance metric. In one example, a relative performance index for each metric is calculated by performing the following steps:

1) Calculate mean M
2) Calculate standard deviation (SD)
3) Subtract mean M from each observation
4) Divide the SD into 20, obtaining quotient Q.
5) Multiply each observation by Q
6) Add 100 to each observation This results in and index score for each observation/metric equal to the following: index score=((observation−mean)*(20/SD))+100. The index scores for each observation/metric are aggregated together to form an overall performance index. In one example, the index scores for each observation/metric are aggregated together by taking the mean score for each carrier. In other examples, a different aggregation method may be used, for example taking the average of the index scores for each observation/metric.

FIG. 1 is a diagram illustrating an example environment in which a system to generate an overall performance index operates. The environment includes a cell tower 102 in communication with phones 104 and 106. In one example, phone 106 is a smartphone having a smartphone app 108 installed thereon. A vehicle 110 is within the coverage of cell tower 102. An overall performance index generator 112 is communicatively coupled to a display 114 and a local datasource 116. The cell tower 102, the vehicle 110, the overall performance generator 112 and storage 120 are communicatively coupled to a network 122, for example the Internet.

In operation, cell tower 102 may have multiple carriers operating therefrom. The phones (two are shown) transmit and receive information wirelessly to one of the carriers operating on the cell tower 102. The carriers may make internal network performance measurements on the performance of phones coupled to the cell tower. The internal network performance measurements may be stored in a datasource, for example in one of the datasources located in storage 120. Therefore storage 120 may contain a datasources for multiple carrier's internal network performance measurements.

Phone 106 has a smartphone app 108 operating on phone 106. The smartphone app 108 can communicate with the network 122 through the wireless link between phone 106 and cell tower 102. Mobile performance data is collected by the smartphone app 110, which is installed on smartphone 106. As the smartphone 106 is used, the smartphone app 108 passively collects data on various aspects of network performance. This data is returned to a collection device for analysis.

The overall performance index generator 112 accesses different datasources either locally or through network 122. Local data source 116 may include one or more datasources similar to the multiple datasources in storage 120.

Storage 120 is a device that stores information, for example network attached storage (NAS), a data center or the like. In some examples, storage device 220 includes multiple datasources 1-N. The different datasources may be operated by the same entity, for example Nielsen, or by multiple different entities, for example different carriers, other third parties and/or Nielsen. Storage device 220 may be at a single location or may be distributed across a number of different location.

Drive test data is collected by equipping vehicles with network performance measurement equipment, for example vehicle 110. Vehicle 110 is positioned within the cell coverage of cell tower 102 and can monitor the communications between phone 104 and cell tower 102. The equipment inside vehicle 110 runs various tests of different network performance parameters between phone 104 and cell tower 102, and collects the results of those tests. The results are analyzed and stored for later use in a storage location, for example storage 120. A Nielsen datasource that delivers this data is referred to as Nielsen Drive Test (NDT).

Mobile Performance Data is collected by a smartphone app, which is installed on a panelists' smartphone, for example phone 106. As phone 106 is used, the smartphone app, for example smartphone app 108, passively collects data on various aspects of network performance. This data is returned for analysis and stored in a storage location, for example storage 120. A Nielsen datasource that delivers this data is referred to as Nielsen Mobile Performance (NMP).

The overall performance index generator 112 accesses different datasources, for example the data sources inside storage 120, through network 120. Each datasource may have one or more data sets included in the datasource. The overall performance index generator accesses metrics within the data sets included in the different datasources to identify metrics that describe the same network performance objective such as data reliability, voice reliability, data speed, voice quality, etc. These metrics for comparison within the various data sets may not be technically identical, but are rather metrics that describe the same aspect of the network performance experience.

The metrics are weighted and combined to produce an overall performance index as describe further below. The overall performance index for different carriers can be displayed on display 114.

Figure 2:
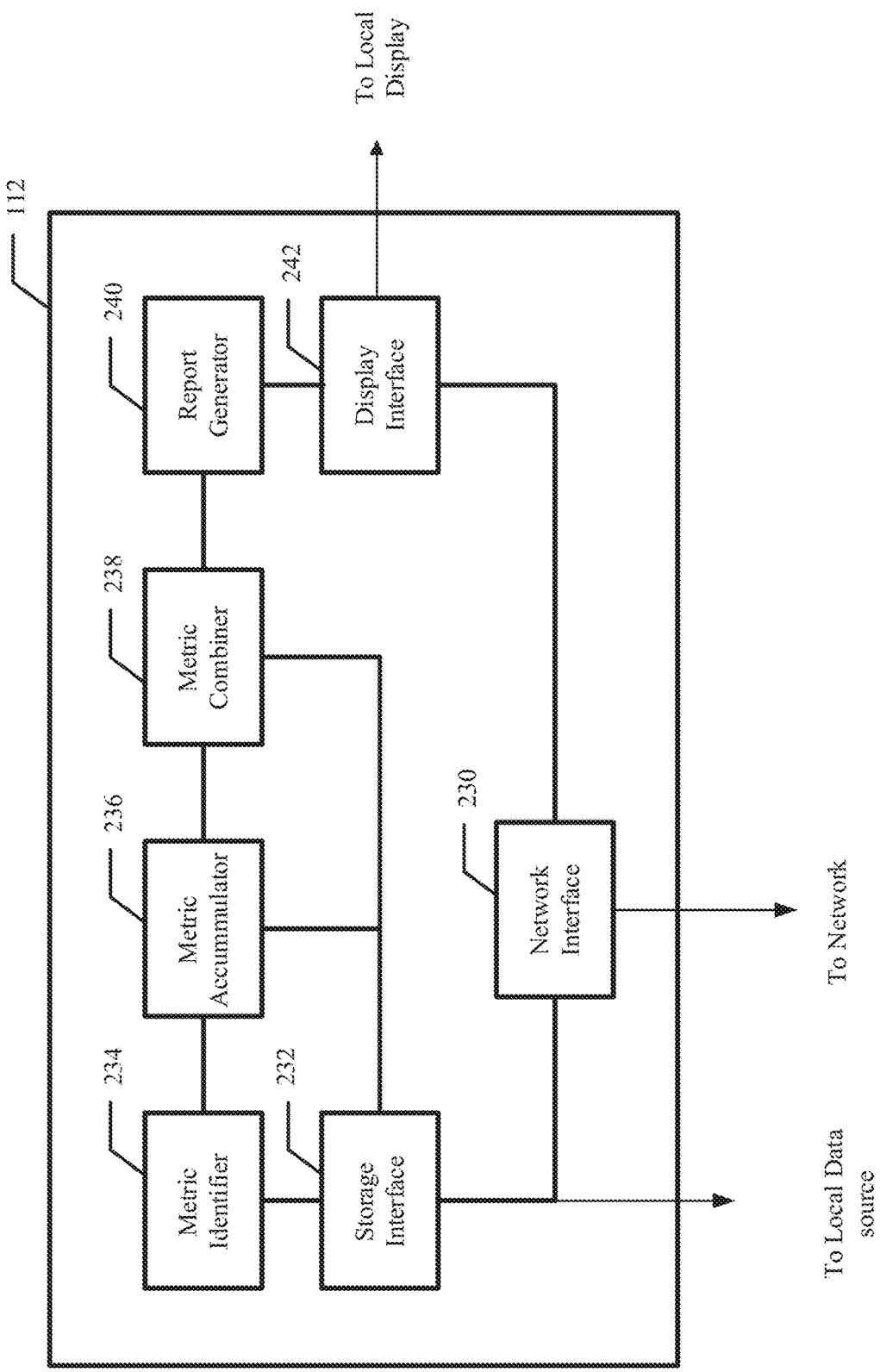
FIG. 2 is an example block diagram of the overall performance index generator of FIG. 1.

FIG. 2 is an example block diagram of an overall performance index generator 112. The overall performance index generator 112 comprises a network interface 230, a storage interface 232, a metric identifier 234, a metric accumulator 236, a metric combiner 238, a report generator 240 and a display interface 242. The overall performance index generator 112 may be the overall performance index generator 112 shown in FIG. 1.

The storage interface 232 is communicatively coupled to the metric Identifier 234, the Metric accumulator 236, the metric combiner 238 the network interface 230 and to local storage, for example the local datasource 116 shown in FIG. 1. The metric identifier 234 is communicatively coupled to the storage interface 232 and the metric accumulator 236. The metric accumulator 236 is communicatively coupled to the metric identifier 234 and the metric combiner 238. The metric combiner 238 is communicatively coupled to the metric accumulator 236 and the report generator 240. The report generator 240 is communicatively coupled to the metric combiner 238 and the display interface 242. The display interface is communicatively coupled to the report generator 240, the network interface 230 and to a display, for example the display 114 shown in FIG. 1.

The network interface 230 is communicatively coupled to a network, for example the network 122 shown in FIG. 1. The network interface 230 enables communication with other devices in communication with the network 122, for example storage 120 shown in FIG. 1 and/or a remote display (not shown).

The storage interface 232 is used to access storage devices. The storage interface 232 can access local storage directly, for example the local datasource 116 shown in FIG. 1. The storage interface 232 accesses storage attached to a network, for example storage 120 shown in FIG. 1, through network interface 230.

The metric identifier 234 accesses at least two different datasources, for example datasource 1 and datasource 2 in storage 120 from FIG. 1. The datasources may be in storage that is attached to a network or in local storage. The metric identifier 234 accesses local storage, for example the local datasource 116 from FIG. 1, directly through storage interface 232. The metric identifier 234 accesses storage attached to a network, for example the storage 120 from FIG. 1, through the storage interface 232 and the network interface 230.

In this example, the metric identifier 234 can communicate with multiple datasources, for example the datasources in storage 120 in FIG. 1. In other examples there may be a metric identifier 234 for each datasource.

The metric identifier 234 accesses the datasources, for example the datasources (116, 124, 126 and 128) in storage 120 in FIG. 1, to identify metrics in the different datasources that describe the same network performance objective such as data reliability, voice reliability, data speed, voice quality, etc. The metrics identified in the different datasources (116, 124, 126 and 128) may not be technically identical, but are rather metrics that describe the same aspect of the network performance experience in the two different datasources. In some examples, a list of metrics that describe given aspects of network performance are stored in the datasources (116, 124, 126 and 128). The list of metrics is accessed by the metric identifier 234 to identify the metrics in the different datasources that describe the same network performance objective.

The metric identifier 234 also determines the data values used to calculate the identified metrics. In some examples the data values for a given metric will be different in different datasources. For example, the transfer time in the data throughput metric in one datasource may include both the time it takes to transfer the data and the latency between when the transfer was initiated and when it began. The transfer time in another datasource may have separate variables for the transfer time and the latency. In some examples, a mapping between the data values and the metrics are stored in each datasource (116, 124, 126 and 128). The metric identifier 234 obtains the mapping from the datasources (116, 124, 126 and 128).

In one example, the metrics identified from the two datasources may include data metrics and voice metrics. The data metrics may include a data reliability metric, a data throughput metric, a passive data coverage metric and an active data coverage metric. The data reliability metric is a measure that combines two aspects of data network performance: Accessibility and Retainability. Accessibility is a measure of how accessible the data network is when needed. Accessibility is measured by calculating the success rate of establishing a data connection with the network. Retainability is measured once a data connection is established by calculating the rate of successful completion of the data session. The data reliability metric is equal to the product of data accessibility and data retainability.

The data throughput metric is a measure of the total speed of the data request. This factors in the latency (the delay before start of the transaction with the cellular network), and the duration of servicing the transaction. The data throughput metric includes the total time that the customer waits after they send out a request, to when the request is fully serviced.

Data throughput may be measured differently in different datasources. For example, in the NDT two variables may be used, one variable for the amount of data transferred and another variable that includes both the latency and the data transfer time. In the NMP datasource, data throughput may be measured using three different variables, one variable for the amount of data transferred, one variable for the latency, and a third variable for the data transfer time.

In some examples, the data throughput metric is measured using different file sizes or different data amounts that are transferred. For example, the data throughput metric may be calculated for small, medium and large file sizes or different data amounts.

The voice metrics may include a voice reliability metric (similar to the data reliability metric). The voice reliability metric is a measure that combines two aspects of voice network performance: Accessibility and Retainability. Accessibility is an aspect that measures how accessible the voice network is when needed. Accessibility is measured by calculating the success rate of establishing a voice connection with the network. Retainability is measured once a voice connection is established. Retainability is measured by calculating the rate of successful completion of the voice session. Voice reliability is equal to the product of voice accessibility and voice retainability.

Cellular networks provide coverage using different types of technologies (4G LTE, 3G, EDGE etc.) based on several factors, like—region, network traffic, phone model etc. Further, based on the needs of the customers at a time, and the capabilities of the network infrastructure, carriers shift the traffic from one type of technology to the other. The technology used by the carrier network at any given time, affects the customer experience. Data coverage metrics are aimed at assessing the quality of service based on the percent of time spent by a customer/device in coverage with the more advanced technologies (e.g., 4G), vs. the older technologies (EDGE etc.).

Data coverage metrics may include active and passive data coverage metrics. An active data coverage metric is a measure of the percentage of time spent using the advance technology minus the percentage of time spent using the older technology while the customer/devices were in an active data session. A passive data coverage metric is a measure of the percentage of time spent using the advance technology minus the percentage of time spent using the older technology while the customer/devices were in standby mode.

In one example the metrics identified from the two datasources (NDT and NMP) are: data reliability, data throughput, active data coverage, passive data coverage and voice reliability. These metrics are calculated using data variables inside each datasource, for example: the number of data connection attempts, the number of successfully data connections, the number of successfully data transfers, the number of voice call attempts, the number of dropped calls, the number of bytes transferred, the data transfer rate, the call duration, latency and the like. The identified metrics and the variables used to calculate the metrics are passed from the metric identifier 234 to the metric accumulator 236.

The metric accumulator 236 accesses the different datasources through the storage interface 232. The metric accumulator 236 accumulates a list of the data values used to calculate each of the different identified metrics from each of the datasources and stores the accumulated list in storage, for example local datasource 116 from FIG. 1. The metric accumulator 236 accumulates a list of data values for each identified metric for a geographic region in a study area.

The study area may be any size, for example the area serviced by a single cell tower, a single city, the area covered by one or more zip codes, a single state, a country or the like. In one example, the geographic region size may be dependent on the study area size, with the geographic region size increasing as the study area increases. In other examples, the geographic region size may be a constant size independent of the study area. The geographic region size may be any size, for example the area serviced by a single cell tower, a single city, the area covered by one or more zip codes or may be equal to the study size. The geographic region size may be based on carrier site shape files. In some examples, the metrics and indexes are calculated dynamically based on the selected region size.

Only geographic regions with a minimum number of data points will be used. In one example the threshold for the number of data point in a geographic region is 100. In other examples the threshold for the minimum number of data points in a geographic region may be higher or lower.

In one example the metric accumulator 236 accesses the two datasources (NDT and NMP) to accumulate data values for the following data metrics identified by the metric identifier 234: a data reliability metric, a data throughput metric, a passive data coverage metric and an active data coverage metric.

The data accessibility metric is measured by calculating the success rate of establishing a data connection with the network. The values for the data accessibility metric for the two data (NDT and NMP) sources are accumulated using the following process:
For the NDT datasource:
 The data accessibility metric is equal to the number of requests (data GET, data POSTS and data connection requests) that were successful, divided by the total number of requests.
For example:
Data accessibility metric=(1−(number of setup failures or number of connect failures))/(number of data GET requests+number of data POSTS requests+number of data connection requests)

For the NMP datasource:
 The data accessibility metric is equal to the number of data sessions that were successful, divided by the total number of data sessions.
For example:
Data accessibility metric=successful data sessions/total number of data sessions Data retainability is measured once a data connection has been established. Data retainability is measured by calculating the rate of successful completion of the data session. The values for the data retainability metric for the two data (NDT and NMP) sources are accumulated using the following process:
For the NDT datasource:
Data retainability=(total number of successful uploads+total number of successful downloads)/(total number of uploads+total number of downloads)
For the NMP datasource:
 The data accessibility metric is equal to the number of data sessions that were successful, divided by the total number of data sessions.
For example:
Data accessibility metric=successful data sessions/total number of data sessions Data throughput is a measure of the total speed of the data request. Data throughput factors in the latency (the delay before start of the transaction with the cellular network), and the duration of servicing the transaction. Data throughput includes the total time that the customer waits after they send out a request, to when the request is fully serviced. In some examples, the data throughput metric is measured using different file sizes or different data amounts that are transferred. For example, the data throughput metric may be calculated for small, medium and large file sizes or data amounts.

The values for the data throughput metric for three sizes of data transfers for the two data (NDT and NMP) sources are accumulated using the following processes:
For the NDT datasource:
Select a data size range for each data size category (i.e. small, medium and large).
For each data range:
 Throughput=(data size for successful uploads)/(Average user perceived throughput)
 Throughput=(data size for successful downloads)/(Average user perceived throughput (which includes latency))
For the NMP datasource:
Select a data size range for each data size category (i.e. small, medium and large).
For each data range:
 Look at the distribution of file size as noted in 'NumberBytesReceived', and remove the outliers;
Split the distribution in 3 equal sections based on file size.
Categorize the data points in the first section (the smallest) as S, second section (medium) M, and (large) L.
 Throughput=((number of bytes sent for successful uploads)/(Throughput speed))+Average Latency
 Throughput=((number of bytes received for successful downloads)/(Throughput speed))+Average Latency The voice accessibility metric is measured by calculating the success rate of establishing a voice connection with the network. The values for the voice accessibility metric for the two data (NDT and NMP) sources are accumulated using the following queries:

For the NDT datasource:
The voice accessibility metric is equal to the number of call that were successfully connected to the network, divided by the total number of calls attempted.
For example:
Voice accessibility metric=(1−(number of failed access))/(total number of calls)
For the NMP datasource:
The voice accessibility metric is equal to the number of call that were successfully connected to the network, divided by the total number of calls attempted.
For example:
Voice accessibility metric=(number of successful setups)/(total number of calls)

The voice retainability metric is measured once a voice connection has been established. Voice retainability is measured by calculating the rate of successful completion of the voice session. The values for the voice retainability metric for the two data (NDT and NMP) sources are accumulated using the following processes:
For the NDT datasource:
The voice accessibility metric is equal to the number of call that were successfully connected to the network, divided by the total number of calls attempted.
For example:
For each call that connected (i.e. results !=Failed access)
Voice accessibility metric=(1−(number of dropped calls))/(total number of calls)
For the NMP datasource:
The voice accessibility metric is equal to the number of call that were successfully connected to the network, divided by the total number of calls attempted.
For example:
Voice accessibility metric=(number of successful sessions)/(total number of calls)

The coverage metrics detailed below are aimed at assessing the quality of service based on the percent of time spent by a customer/device in coverage with the more advanced technologies for that phone (e.g. 4G), vs. the older technologies for that phone (EDGE etc.). The coverage is calculated using a Max_technology and Min_technology variable that are phone dependent. Max_technology refers to the most advanced available to the device that is being used. Min_technology refers to the least advanced technology available to the device that is being used. For example, for a Samsung Galaxy S5 phone, the Max_technology will be 4G LTE. On the other hand, for a Samsung Galaxy S1 phone, the Max_technology will be 3G.

The coverage metrics are measured in the passive and active states. Passive data coverage is a measure of the time that the customer/devices were in standby mode (not actively in a data/voice session). The values for the passive data coverage metric for the two data (NDT and NMP) sources are accumulated using the following processes:
For the NDT datasource:
Passive coverage=(percent of time spent on Max_technology when in standby mode)−(percent of time spent on Min_technology when in standby mode)
For the NMP datasource:
Passive coverage=(percent of time spent on Max_technology when in standby mode)−(percent of time spent on Min_technology when in standby mode)

Active data coverage is a measure of the time that the customer/devices were in an active data session. The values for the active data coverage metric for the two data (NDT and NMP) sources are accumulated using the following processes:

For the NDT datasource:
Active coverage=(percent of time spent on Max_technology when in an active data session)−(percent of time spent on Min_technology when in an active data session)
For the NMP datasource:
Active coverage=(percent of time spent on Max_technology when in an active data session)−(percent of time spent on Min_technology when in an active data session)

Once the metric accumulator 236 has retrieved the data values for the data for each metric identified by the metric identifier 234, the data values are passed to the metric combiner 238.

Metric combiner 238 is communicatively coupled to the metric accumulator 236, report generator 240 and storage interface 232. In one example, the metric combiner 238 combines the data values for each metric into a single metric value. The metric combiner 238 then indexes each metric value. In some examples, the metric combiner 238 weights the different indexed metric values and then combines them to produce an overall performance index. In other examples, the metric combine combines the indexed metric values to produce an overall performance index, without weighting the indexed metric values. The method used to combine the data values for a metric may be metric dependent.

There are some data values and/or metrics in the different datasources that describe the same aspect of the network performance experience. These data values/metrics can be weighted and combined directly by the metric combiner 238. When the data values or data metrics don't describe the same aspect of the network performance experience in the different datasources, metric combiner 238 may combine the individual data values or data metrics from one or both datasources into an intermediate data values or intermediate metrics. The intermediate data values or metrics are selected such that it does describe the same aspect of the network performance experience between the different datasources. In other examples, an intermediate metric may be created for metrics that do describe the same aspect of the network performance experience between the different datasources.

In the example using the NDT datasource and the NMP datasource to create an overall performance index, two examples of data values that are weighted and combined without using an intermediate metric by the metric combine 238 are passive data coverage and active data coverage. In the same example, a metric data reliability is created using the two intermediate metrics data accessibility and data retainability.

The data accessibility metric is measured as a percentage of successful data connections to the total number of data connection attempts. The data retainability metric is measured as a percentage of the number of successful completions of the data transfer to the total number of attempted data transfers (see above). The data accessibility metric in the NDT datasource is calculated using the data variables: the number of setup failures, the number of connect failures, the number of data requests, the number of data posts, and the number of data connection requests. The data retainability metric in the NDT datasource is calculated using the data variables: total number of successful uploads, the total number of successful downloads, the total number of uploads and the total number of downloads.

The metric combiner 238 calculates the values for the intermediate metric data reliability for each datasource using the following formula:

$$\text{Data reliability} = \text{data accessibility} \times \text{data retainability}$$

where the data accessibility metric is multiplied by the data retainability metric to give a value for the data reliability metric for each datasource.

For example, assume that for a given geographic area for a selected carrier, the drive test equipment (in the NDT datasource) collected 1000 reading of attempted data connections in the geographic area. Out of these 1000 attempted data connections, 100 were failures and 900 were successful. Therefore the data accessibility score for that geographic region, for the selected carrier, would be 0.9 (900/1000). Assuming that the drive test equipment also collected 800 successful data transfers in 1000 transfer attempts, the data retainability score for the geographic region, for the selected carrier, would be 0.8 (800/1000). The data reliability score is equal to data accessibility X data retainability, so the data reliability score for the selected carrier, in that geographic region, would be 0.9×0.8=0.72.

Once the metrics from each datasource describe the same aspect of the network performance experience as a metric in another datasource, or has been combined into a metric that describes the same aspect of the network performance experience as a metric in another datasource, the metrics are indexed.

The metric combiner 238 creates an indexed metric value for each metric. In one example the indexed metric value will be calculate with a mean of 100 and a Standard Deviation (SD) of 20 for each metric. The indexed metric value for each metric is calculated by performing the following steps:

1) Calculate mean M
2) Calculate standard deviation (SD)
3) Subtract mean M from each observation
4) Divide the SD into 20, obtaining quotient Q.
5) Multiply each observation by Q
6) Add 100 to each observation This results in an indexed metric score for each observation/metric equal to the following: indexed metric score= ((observation−mean)*(20/SD))+100. Continuing with the example from above where the data reliability metric for the NDT datasource was 0.9×0.8=0.72. The indexed data reliability metric equals ((0.72×M)*(20/SD))+100. Where M is the mean of the data values used to calculate the data reliability metric and SD is the standard deviations of the data values used to calculate the data reliability metric.

The index metric score for each observation/metric are aggregated together to form an overall performance index for each carrier at each geographic location.

In one example the index metric score for each observation/metric are aggregated together by taking the mean score for each carrier to create the overall performance index. In other examples the index metric score for each metric may be weighted before being combined into the overall performance index.

The index metric value for each metric may be weighted using a number of different methods. One method assigns weights to each metric based on frequency of that behavior by customer population (e.g. assign weights based on average number of calls/data requests that customers make in a given time period). The metric combiner 238 can obtain the frequency of behavior information through the NMP data set, or other On Device Metering solutions (e.g. Nielsen Smartphone Analytics) by accessing the datasource through storage interface 232.

Another method for weighting the index metric value for each metric assigns weights to each metric based on their impact on overall network satisfaction. This level of impact is determined by running a drivers analysis on customer satisfaction survey data. A drivers analysis is a statistical analysis that is used to determine how certain metrics are influenced by other metrics. That is overall satisfaction of a customer, could be influenced by several things like satisfaction with the quality of the cellular network, satisfaction with the data speeds, satisfaction with the price of the service, etc. The Nielsen Mobile Insights datasource is the largest survey of telecom customers in the U.S. The satisfaction data can be obtained from the Nielsen Mobile Insights datasource or from the NMP surveys sent out to the panelists of the NMP product.

The metric combiner 238 creates an indexed metric value for each metric in each geographic region. The metric combiner 236 may also aggregate the indexed metric value for each metric in each geographic region into an indexed metric value for larger areas, up to the size of the study area. The metric combiner 238 creates the indexed metric value for each metric in each geographic region for each carrier in the study. In some examples there may be up to 4 carriers in a study. In other examples there may be more of fewer carriers in a study.

Once the metric combiner has created an indexed metric value for each metric in each geographic region for each carrier, it combines the indexed metric values into an overall performance index. In some examples the indexed metric values may be weighted before being combined.

The report generator 240 accesses the overall performance index for each carrier for a given geographic area and produces a report. The report may be printed or may be displayed, for example on display 114 shown in FIG. 1.

While an example manner of implementing the Overall performance index generator (112) of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 230, the example storage interface 232, the example metric identifier 234, the example metric accumulator 236, the example metric combiner 238, the example report generator 240 and the example display interface 242 and/or, more generally, the example Overall performance index generator 112 of FIG. 2 may be implemented by hardware, software, firmware and/or any combination of hardware, software and/or firmware. Thus, for example, any of the example network interface 230, the example storage interface 232, the example metric identifier 234, the example metric accumulator 236, the example metric combiner 238, the example report generator 240 and the example display interface 242 and/or, more generally, the example Overall performance index generator 112 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, network interface 230, the example storage interface 232, the example metric identifier 234, the example metric accumulator 236, the example metric combiner 238, the example report generator 240 and the example display interface 242 and/or, more generally, the example Overall performance index generator 112 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example Overall performance index generator 112 of FIG. 1 may include one or more elements, processes and/or devices in addition to, or instead of, those illustrated in FIG. 2, and/or may include more than one of any or all of the illustrated elements, processes and devices.

Figure 3:
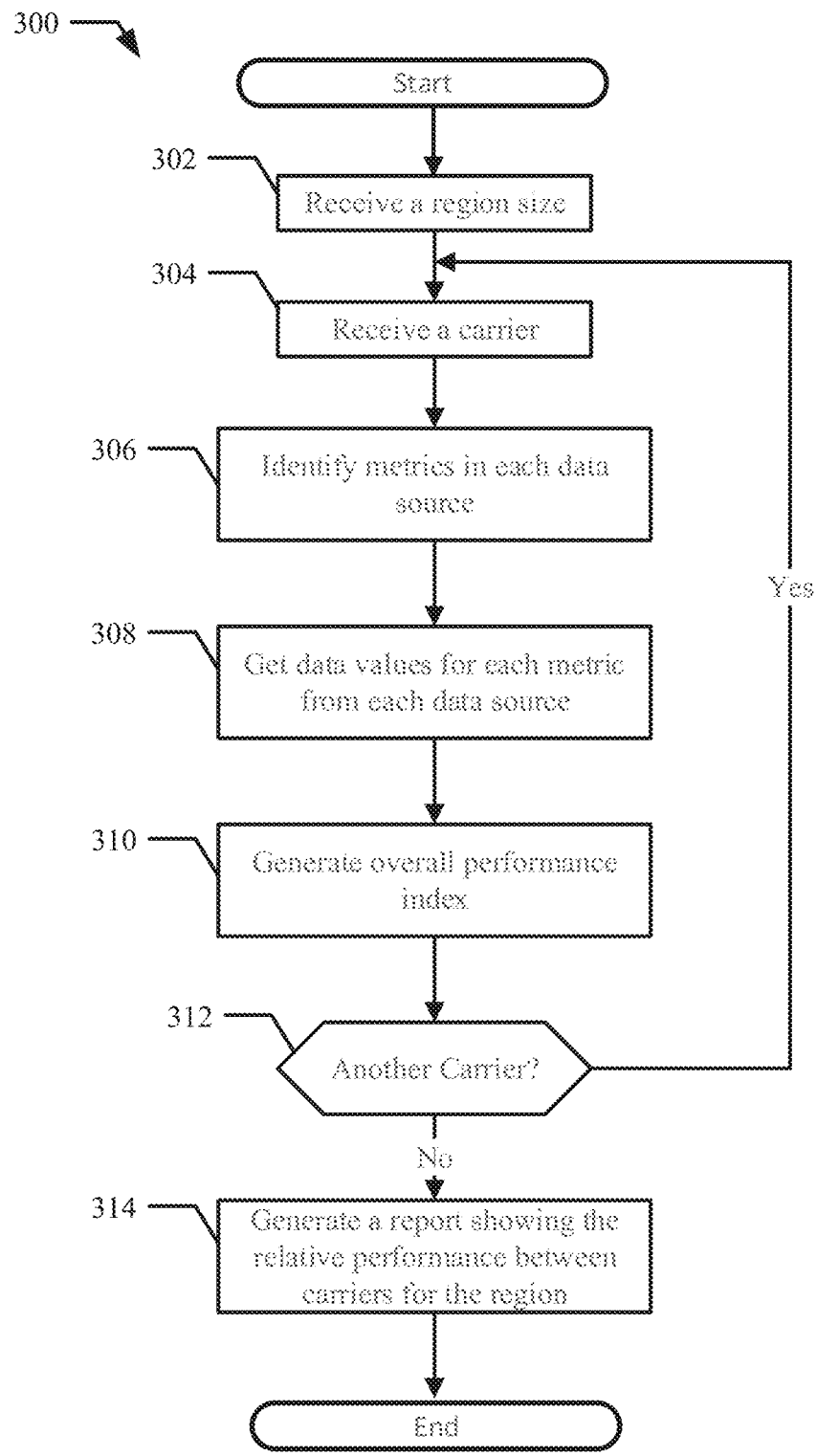
FIG. 3 is a flowchart representative of example machine readable instructions for implementing the overall performance index generator of FIGS. 1 and 2.
Figure 7:
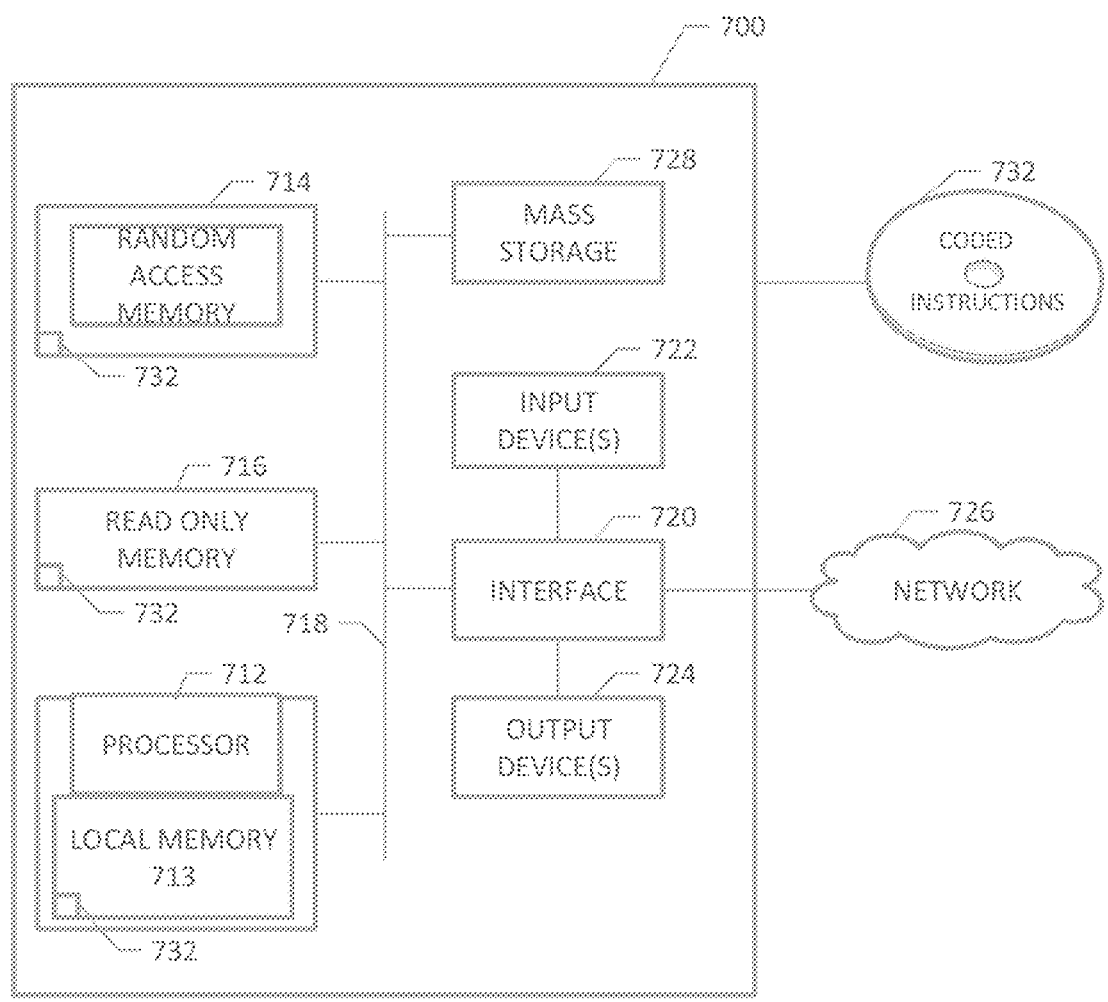
FIG. 7 is a block diagram of an example processor platform 700 capable of executing the instructions of FIGS. 3, 4, 5 and 6 to implement the overall performance index generator of FIGS. 1 and 2.

A flowchart representative of example machine readable instructions for implementing the overall performance index generator 112 of FIG. 2 is shown in FIG. 3. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 3, many other methods of implementing the example overall performance index generator 112 of FIG. 2 may alternatively be used. For example, the order of execution of the blocks may be changed, and/or some of the blocks described may be changed, eliminated, or combined.

As mentioned above, the example processes of FIGS. 3, 4, 5 and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, 5 and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 300 of FIG. 3 begins where the metric identifier 234 receives a geographic region size (block 302), for example a city, a zip code, a state or the like. The geographic size may be preselected, or may be selected from a list of geographic sizes. Flow continues at block 304.

The metric identifier 234 receives one or more carriers of interest in the selected size (block 304). The carriers may be selected from a list of carriers. The carriers may be selected using check boxes, drop down menus or the like. In some examples the carriers may be preselected, for example the 4 major carriers in the United States. Carriers may also be known as wireless providers. Flow continues in block 306.

The metric identifier 234 receives the datasources to be used (block 306). The datasources may be selected from a list of datasources. The list of datasources may include datasources from Nielsen Company's Customer Experience suites, the carrier's own internal network performance measurement datasources and network switching datasources and other third party datasources. The datasources may be selected using check boxes, drop down menus or the like. In some examples the datasources may be preselected, for example the NDT and NMP datasources. The metric identifier 234 identifies the metrics that will be used in each datasource. The metric identifier 234 accesses the datasources to identify metrics in the different datasources that describe the same network performance objective such as data reliability, voice reliability, data speed, voice quality, etc. The metrics identified in the different datasources may not be technically identical, but are rather metrics that describe the same aspect of the network performance experience in the two different datasources.

In the example using the two datasources NDT and NMP, the metrics identified may include: a data reliability metric, a data throughput metric, a passive data coverage metric, an active data coverage metric and a voice reliability metric. The metric identifier 234 also determines the data values used to calculate the identified metrics.

Once all the metrics have been identified the metric identifier 234 either stores the list of metrics and data values in memory/storage, for example the storage 120 in FIG. 1, or passes the list to the metric accumulator 236. Flow continues at block 308.

In block 308 the metric accumulator 236 from FIG. 2 either receives the list of metrics and data values from the metric identifier 234, or accesses the list of metrics and data values from the memory/storage. The metric accumulator 236 accesses the different datasources and retrieves the data values for the metrics identified by the metric identifier 234 for the selected geographic area. The metric accumulator 236 accesses the different datasources through the storage interface 232. Once the metric accumulator 236 has retrieved the data values for each metric identified by the metric identifier 234, the data values are passed to the Metric combiner 238 or saved in memory/storage, for example storage 120. Flow then continues at block 310.

At block 310 the metric combiner 238 from FIG. 2 creates the overall performance index as described below with reference to FIGS. 4, 5 and 6. The overall performance index may be stored for later use, for example in storage 120 of FIG. 1. Flow continues at block 312.

At block 312 a check is made to determine if there are more carriers selected. When there are additional carriers, flow returns to block 304. When there are no additional carriers, flow continues to block 314.

At block 314 the report generator 240 from FIG. 2 generates a report showing the overall performance index for the carriers of interest for a geographic area. The report may be printed, may be sent to a local display using display interface 242, for example display 114 in FIG. 1, or may be sent to a remote display (not shown) using the display interface 242 and the network interface 230 in FIG. 2.

Figure 4:
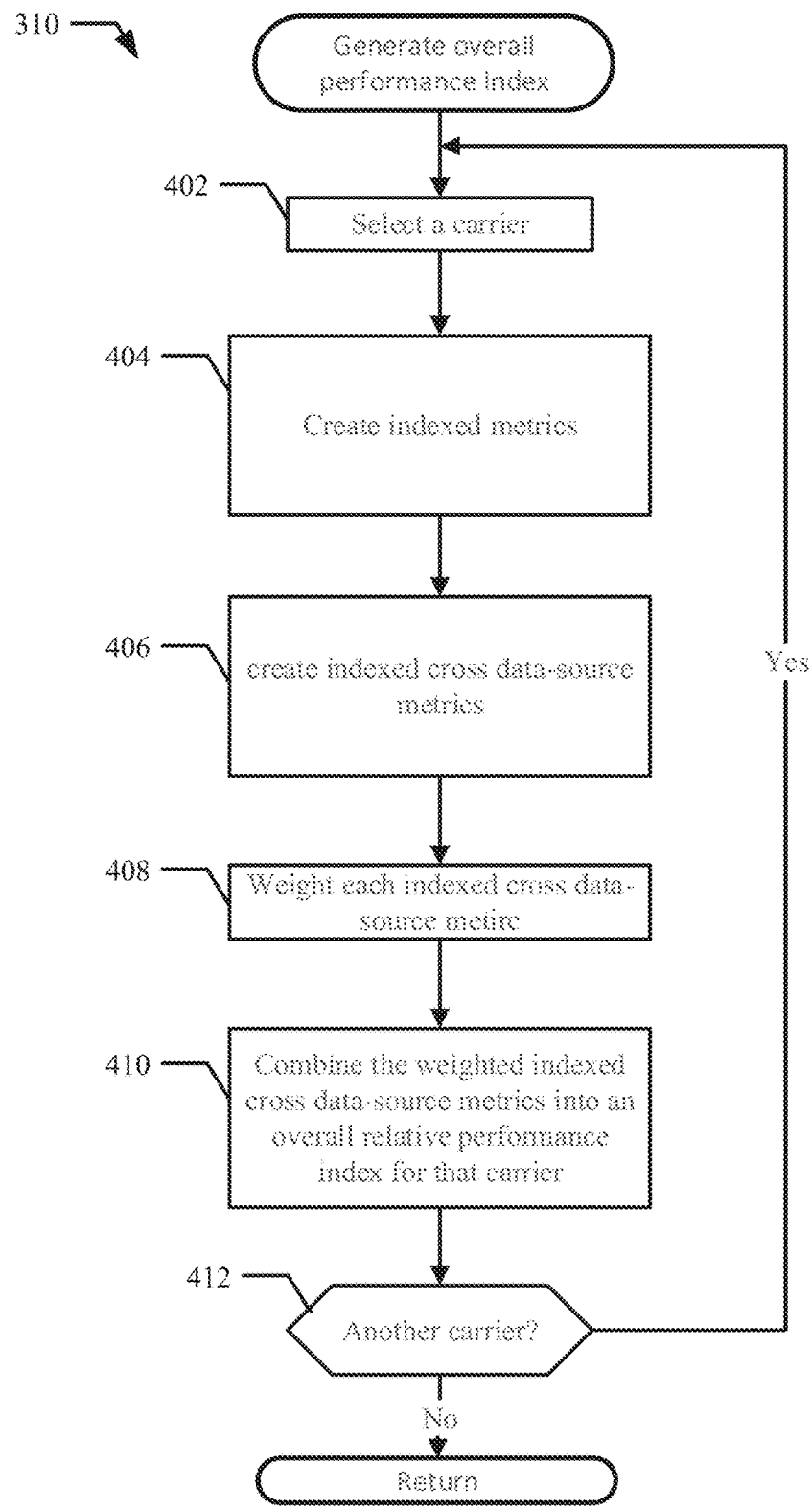
FIG. 4 is a flowchart representative of example machine readable instructions for implementing the generate an overall performance metric functionality of FIG. 3.

FIG. 4 is a flowchart representative of example machine readable instructions for implementing the process in block 310 of FIG. 3. The metric combiner 238 of FIG. 2, selects a carrier (block 402). Flow continues in block 404.

Figure 5:
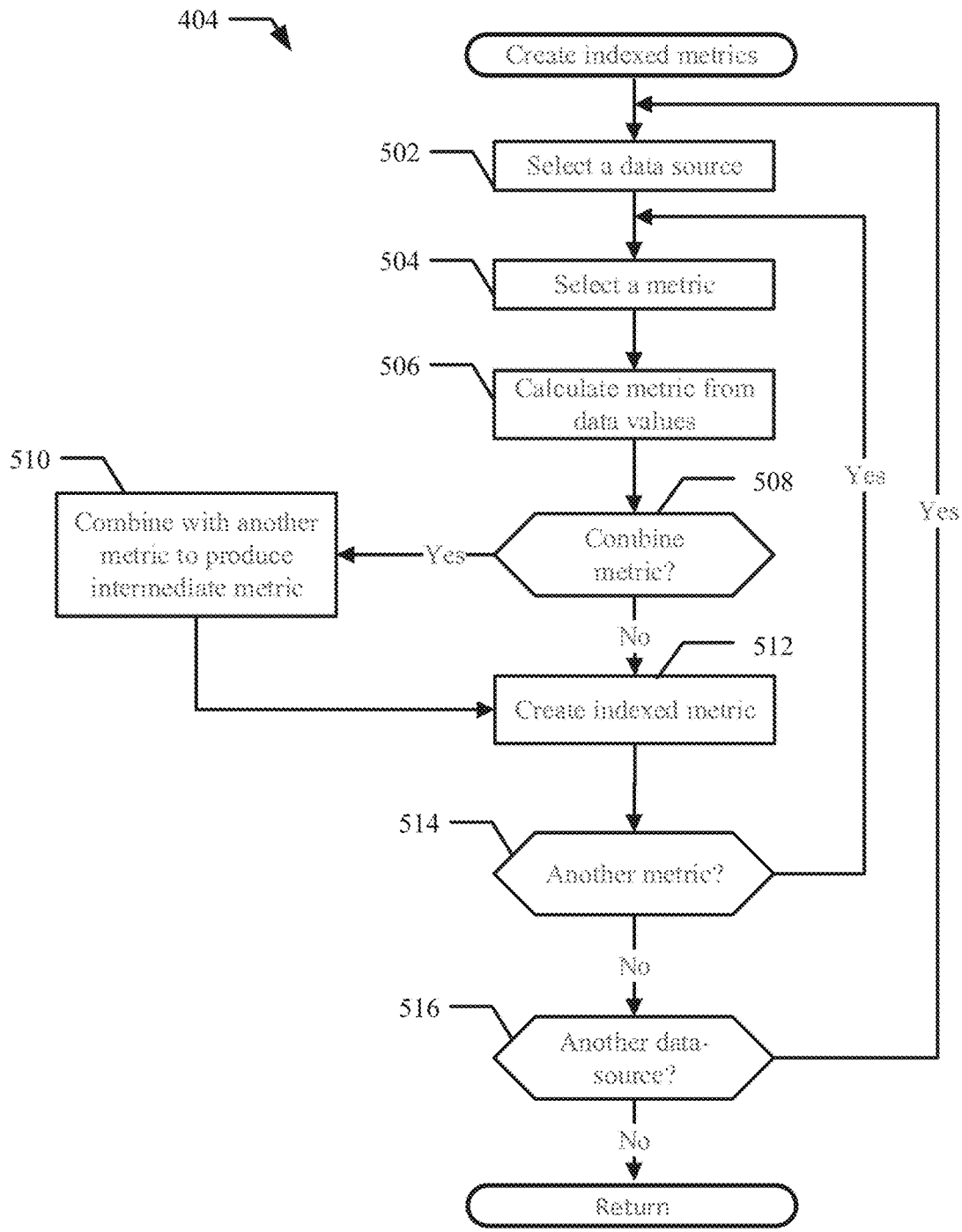
FIG. 5 is a flowchart representative of example machine readable instructions for implementing the generate indexed metric functionality of FIG. 4.

The metric combiner 238 from FIG. 2, creates indexed metrics for each metric that describes the same aspect of network performance in each datasource (block 404) as discussed further in reference to FIG. 5. Flow continues in block 406.

Figure 6:
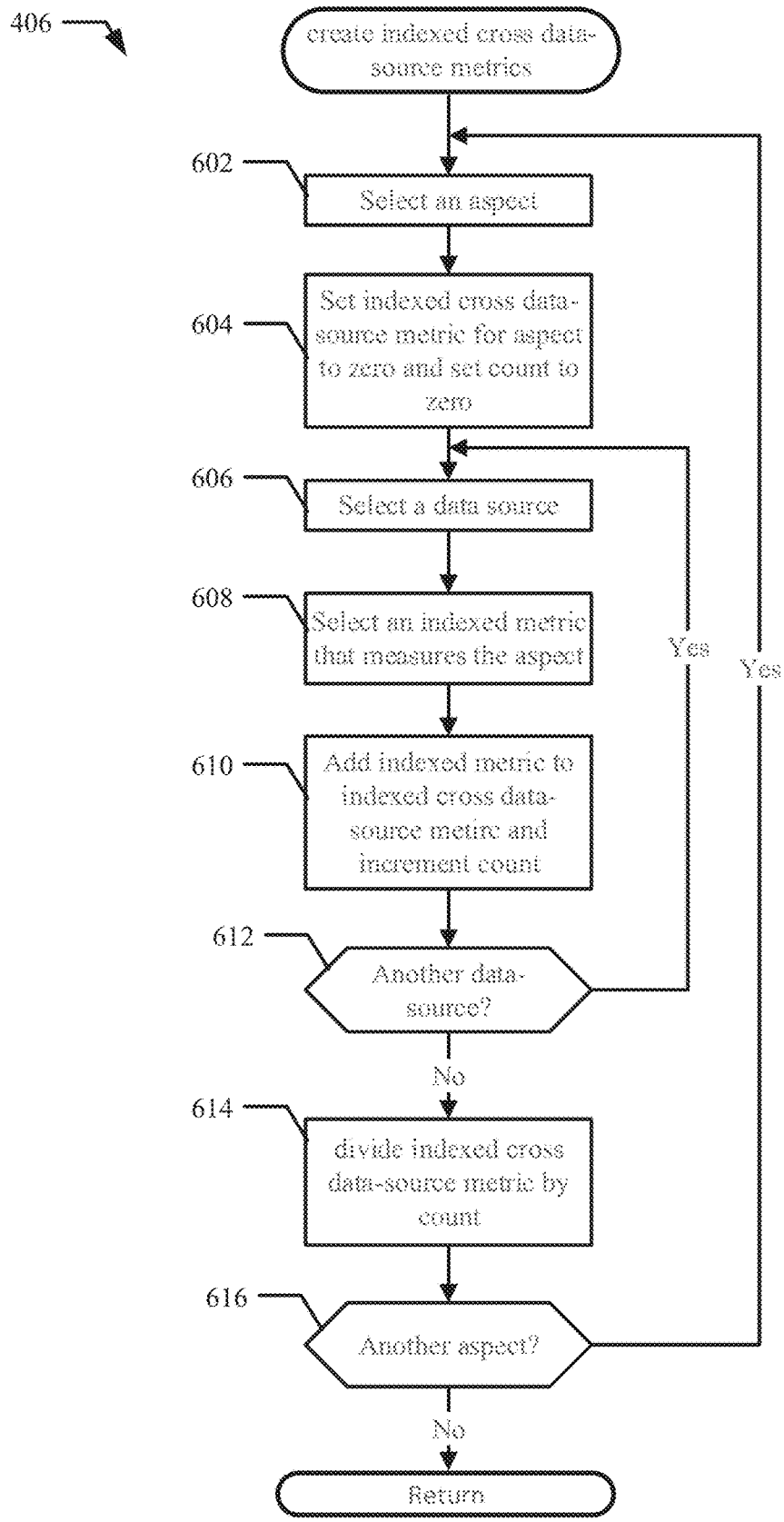
FIG. 6 is a flowchart representative of example machine readable instructions for implementing the generate indexed cross datasource metric functionality of FIG. 4.

In block 406, the metric combiner 238 from FIG. 2, creates cross indexed datasource metric (block 406) as discussed further in reference to FIG. 6. Flow continues in block 408.

The metric combiner 238 from FIG. 2, weights the cross datasource indexes for each aspect (block 408). The metric combiner 238 may use different weighting techniques to weight the cross datasource indexes for each aspect. In one example weighting approach the weights assigned to each metric will be based on their impact on overall network satisfaction. This level of impact may be determined by running a Drivers Analysis on customer satisfaction survey data. A Drivers Analysis is a statistical analysis that is used to determine how certain metrics are influenced by other metrics. E.g. Overall Satisfaction of a customer, could be influenced by several things like—satisfaction with the quality of the cellular network, satisfaction with the data speeds, satisfaction with the price of the service, etc. A Drivers Analysis will help determine how big a role each of the factors plays in determining the Overall Satisfaction.

For satisfaction data, either Nielsen Mobile Insights, or NMP surveys may be used. Nielsen Mobile Insights is the largest survey of telecom customers in the US. As part of the NMP study, surveys are sent out to the panelists to determine satisfaction data.

In another example weighting approach, the weights assigned to each metric will be based on the frequency of that behavior by customer population (e.g. assign weights based on average number of calls/data requests that customers make in a given time period). The frequency of behavior by customer population can be obtained through the NMP data set, or other On Device Metering solutions (e.g. Nielsen Smartphone Analytics). Flow continues in block 410.

The metric combiner 238 from FIG. 2, combines the weighted indexed cross datasource metrics for each aspect into an overall performance index (ORPI) for that carrier (block 410). For example, the overall performance index for carrier A, when using the two data sources NDT and NMP would be ORPI for carrier A=average (weighted cross datasource index for data reliability, weighted cross datasource index for voice reliability, weighted cross datasource index for data throughput, weighted cross datasource index for passive data coverage, weighted cross datasource index for active data coverage). Flow continues in block 412.

The metric combiner 238 determines if there is another carrier (block 412). When there is another carrier flow returns to block 402. When there are no more carriers, flow exits block 412 and returns to block 312 in the flow chart from FIG. 3.

FIG. 5 is a flowchart representative of example machine readable instructions for implementing the process in block 404 of FIG. 4. The metric combiner 238 creates indexed metrics (block 404). Flow starts in block 502. Flow enters block 502 from block 402 of the flow chart shown in FIG. 5. The metric combiner 238 of FIG. 2 selects a datasource (block 502. Flow continues in block 504.

The metric combiner 238 of FIG. 2 selects a metric from the list of identified metrics produced by the metric identifier 234 of FIG. 2 (block 504). Flow continues in block 506.

The metric combiner 238 of FIG. 2 calculates the selected metric using the identified data values for the selected data source (block 506). In some examples, the data values used to create the selected metric may be different for different datasources. Flow continues in block 508.

The metric combiner 238 determines if the selected metric will be combined with another metric in the same datasource to create an intermediate metric (block 508). When the metric will not be combined, for example the passive data coverage metric, flow continues at block 512. When the selected metric will be combined with another metric in the same datasource, flow continues in block 510.

The metric combiner 238 combines two or more metrics into an intermediate metric (block 510). For example, voice accessibility and voice retainability are combined to form the voice reliability metric. In another example, the number of bytes transferred metric, the transfer time metric and the latency metric are combined into a data throughput metric. Flow continues in block 512.

The metric combiner 238 calculates an index for the selected or combined metric (block 512). The index is calculated where the index=((observation−mean)*(20/SD))+100. Where M is the mean and SD is the standard deviation of the observations/data of the selected metric. Flow continues at block 514.

The metric combiner 238 determines if there is another metric (block 514). When there is another metric, flow returns to block 504. When there are no more metrics, flow continues at block 516. The metric combiner 238 determines if there is another datasource (block 516). When there is another datasource, flow returns to block 502. When there are no more datasources, flow exits to block 406 in the flow chart of FIG. 4.

FIG. 6 is a flowchart representative of example machine readable instructions for implementing the process in block 406 of FIG. 4. The metric combiner 238 creates indexed cross datasource metrics (block 406). For example, when using the two datasources NDT and NMP, the indexed metric for the data reliability metric from the NDT datasource will be combined with the indexed metric for the data reliability metric for the NMP datasource. In one example the indexed metrics for the same aspect of network performance for each datasource will be averaged together. Flow starts in block 602. Flow enters block 602 from block 404 of the flow chart shown in FIG. 4. The metric combiner 238 of FIG. 2 selects an aspect of network performance (block 602). Flow continues in block 604.

The metric combiner 238 of FIG. 2 sets the indexed cross datasource metric for the selected aspect of network performance to zero and sets a count to zero (block 604). Flow continues in block 606. The metric combiner 238 of FIG. 2 selects a data source (block 606). Flow continues in block 608.

The metric combiner 238 of FIG. 2 selects an indexed metric that measures the selected aspect of network performance (block 608). Flow continues in block 610.

The metric combiner 238 of FIG. 2 adds the indexed metric value of the selected aspect of network performance to the indexed cross datasource metric for the selected indexed metric and increments the count (block 610). In other examples the indexed metric value of the selected aspect of network performance may be weighted before being added to the indexed cross datasource metric for the selected indexed metric. The indexed metric value of the selected aspect of network performance may be weighted using any method. One example method assigns weights to each metric based on frequency of that behavior by customer population. Another example method assigns weights to each metric based on their impact on overall network satisfaction. Flow continues in block 612.

The metric combiner 238 of FIG. 2 determines if there is another datasource (block 612). When there is another data source flow returns to block 606. When there are no more datasources, flow continues in block 614.

The metric combiner 238 of FIG. 2 divides the indexed cross datasource metric for the selected metric by the count, thereby calculating an average of the indexed values for the selected aspect of network performance for the selected datasources (block 614). Flow continues in block 616.

The metric combiner 238 of FIG. 2 determines if there is another aspect of network performance (block 616). When there is another aspect of network performance, flow returns to block 602. When there are no more aspects of network performance, flow continues in block 408 of FIG. 4.

FIG. 8 is a block diagram of an example processor platform 800 capable of executing the instructions of FIGS. 3, 4, 5 and 6 to implement the overall performance index generator 112 of FIG. 2. The processor platform 800 can be, for example, a server, a personal computer, a mobile device (e.g., a cell phone, a smart phone, a tablet such as an iPad™), a personal digital assistant (PDA), an Internet appliance or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a keyboard, a button, a mouse, a touchscreen, a track-pad, a trackball, isopoint and/or a voice recognition system.

One or more output devices 724 are also connected to the interface circuit 720 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 3-6 may be stored in the mass storage device 728, in the volatile memory 714, in the non-volatile memory 716, and/or on a removable tangible computer readable storage medium such as a CD or DVD.

From the foregoing, it will appreciate that the above disclosed methods, apparatus and articles of manufacture allow a carrier to combine different datasources into an overall metric or index that the carrier can use to compare their network performance with their network performance objectives and/or their competitors. The overall performance metric can be compared at different geographic sizes.

The overall network performance index allows a carrier to prioritize the elements of the network that need improvement compared to their network metrics and/or their competitors relative network performance.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to generate an overall performance index, the method comprising:
   accessing a first set of data values for wireless providers of interest from a first datasource, where the first set of data values indicate a first measure of a first aspect of network performance, the first datasource measures the first aspect of the network performance using a first specific collection method, the first specific collection method being drive test measurement;
   accessing a second set of data values for the wireless providers of interest from a second datasource, different from the first datasource, where the second set of data values indicate a second measure of the first aspect of network performance, the second datasource measures the first aspect of the network performance using a second specific collection method, different than the first specific collection method;
   generating a first metric from the first set of data values and a second metric from the second set of data values;
   generating a first indexed metric for the first metric using the first set of data values by:
      calculating a mean of the first set of data values;
      calculating a standard deviation of the first set of data values;
      subtracting the mean from the first metric to obtain a difference;

dividing 20 by the standard deviation to obtain a quotient;
multiplying the difference by the quotient to obtain a product; and
adding 100 to the product;
generating a second indexed metric for the second metric using the second set of data values;
generating an overall performance index for the wireless providers of interest by combining the first and second indexed metrics; and
generating a report showing the overall performance index for the wireless providers of interest, where the report identifies the relative performance between the wireless providers of interest and prioritizes elements of the network that need the most improvement.

2. The method of claim 1 wherein the first metric is a data metric or a voice metric.

3. The method of claim 2 wherein the data metric includes at least one of a data accessibility metric, a data retainability metric, a data throughput metric, a passive data coverage metric or an active data coverage metric.

4. The method of claim 3 wherein the data throughput metric is calculated for a small data transfer amount, a medium data transfer amount and a large data transfer amount.

5. The method of claim 1 wherein the first datasource is a Nielsen Drive Test (NDT) Datasource and the second datasource is a Nielsen Mobile Performance Datasource.

6. The method of claim 1 wherein the overall performance index is for a geographic area.

7. The method of claim 1 wherein the second specific collection method includes mobile performance measurements.

8. A method to generate an overall performance index, the method comprising:
accessing a first set and a second set of data values for wireless providers of interest from a first datasource, where the first set of data values indicate a first measure of a first aspect of network performance and the second set of data values indicate a first measure of a second aspect of network performance, and where the first datasource measures the first aspect of the network performance using a first specific collection method, the first specific collection method being drive test measurement;
accessing a third set and a fourth set of data values for wireless providers of interest from a second datasource, different from the first datasource, where the third set of data values indicate a second measure of the first aspect of network performance and the fourth set of data values indicate a second measure of the second aspect of network performance;
generating a first metric from the first set of data values, a second metric from the second set of data values, a third metric from the third set of data values and a fourth metric from the fourth set of data values;
generating a first indexed metric for the first metric using the first set of data values;
generating a second indexed metric for the second metric using the second set of data values;
generating a third indexed metric for the third metric using the third set of data values;
generating a fourth indexed metric for the fourth metric using the fourth set of data values;
generating a cross datasource index for the first aspect of network performance by combining the first index metric with the third indexed metric;
generating a cross datasource index for the second aspect of network performance by combining the second indexed metric with the fourth indexed metric;
weighting the cross datasource indexes for the first and second aspects of network performance;
generating an overall performance index for respective ones of the wireless providers of interest by combining the weighted cross datasource index for the first aspect of network performance with the weighted cross datasource index for the second aspect of network performance; and
generating a report showing the overall performance indexes for the respective ones of the wireless providers of interest, where the report identifies the relative performance between the wireless providers of interest and prioritizes elements of the network that need the most improvement.

9. The method of claim 8 wherein weights are assigned to the cross datasource index for the first aspect of network performance and the cross datasource index for the second aspect of network performance based on the impact on overall network satisfaction of the first aspect of network performance and the impact on overall network satisfaction of the second aspect of network performance.

10. The method of claim 8 wherein weights are assigned to the cross datasource index for the first aspect of network performance and the cross datasource index for the second aspect of network performance based on the frequency of behavior by a customer population of the first aspect of network performance and the frequency of behavior by the customer population of the second aspect of network performance.

11. The method of claim 8 wherein the overall performance index is generated for four wireless providers of interest.

12. The method of claim 8 wherein the first metric is a data metric or a voice metric.

13. The method of claim 12 wherein the voice metric includes at least one of a voice accessibility metric or a voice retainability metric.

14. The method of claim 12 wherein the data metric includes at least one of a data accessibility metric, a data retainability metric, a data throughput metric, a passive data coverage metric or an active data coverage metric.

15. The method of claim 14 wherein the data throughput metric is calculated for a small data transfer amount, a medium data transfer amount and a large data transfer amount.

16. The method of claim 8 wherein the first datasource is a Nielsen Drive Test (NDT) Datasource and the second datasource is a Nielsen Mobile Performance Datasource.

17. The method of claim 8 wherein the overall performance index is for a specific geographic area.

18. The method of claim 17 wherein the specific geographic area is an area serviced by a single cell tower, an area of a city, an area covered by one or more zip codes, an area of a state, or an area of a country.

19. An apparatus comprising:
a metric identifier to identify first and second metrics in a first datasource and third and fourth metrics in a second datasource, where the first and third metrics describe a first aspect of network performance and the second and fourth metrics describe a second aspect of network performance for a wireless provider for a geographic area, the first datasource including a first set and second set of data values for indicating a first measure of the first network performance aspect collected using a first specific collection method, the first specific collection method being drive test measurement, the second datasource including a third set and fourth set of data values for indicating a second measure of the first network performance aspect collected using a second, different specific collection method;

a metric accumulator to accumulate data values for the first, second, third and fourth metrics identified by the metric identifier for the geographic area;

a metric combiner to:
  generate a first indexed metric for the first metric using the first set of data values;
  generate a second indexed metric for the second metric using the second set of data values;
  generate a third indexed metric for the third metric using the third set of data values;
  generate a fourth indexed metric for the fourth metric using the fourth set of data values;
  generate a cross datasource index for the first aspect of network performance by combining the first index metric with the third indexed metric;
  generate a cross datasource index for the second aspect of network performance by combining the second indexed metric with the fourth indexed metric;
  weight the cross datasource indexes for the first and second aspects of network performance;
  generate an overall performance index for respective ones of the wireless providers for the geographic area by combining the weighted cross datasource index for the first aspect of network performance with the weighted cross datasource index for the second aspect of network performance; and
a report generator to generate a report showing the overall performance index for the wireless provider for the geographic area, where the report prioritizes elements of the network that need the most improvement.

20. The apparatus of claim 19 wherein the metrics identified include at least one of a data accessibility metric, a data retainability metric, a data throughput metric, a passive data coverage metric, an active data coverage metric, a voice accessibility metric or a voice retainability metric.

21. The apparatus of claim 20 wherein the data throughput metric is calculated for a small data transfer amount, a medium data transfer amount and a large data transfer amount.

22. The apparatus of claim 21 wherein the data throughput metric includes a data transfer time and a latency time.

23. The apparatus of claim 19 wherein the at least two datasources include a Nielsen Drive Test (NDT) Datasource and a Nielsen Mobile Performance Datasource.

24. The apparatus of claim 19, wherein each of the indexed metrics is generated by:
  calculating a mean of the data values for the metric;
  calculating the standard deviation of the of data values for the metric;
  subtracting the mean from the metric to obtain a difference;
  dividing 20 by the standard deviation to obtaining a quotient;
  multiplying the difference by the quotient Q to obtain a product;
  adding 100 to the product.

25. A tangible computer readable medium comprising computer readable instructions which, when executed, cause a processor to at least:

access a first set and a second set of data values for wireless providers of interest from a first datasources, where the first set of data values indicate a first measure of a first aspect of network performance and the second set of data values indicate a first measure of a second aspect of network performance, where the first datasource measures the first aspect of the network performance using a first specific collection method, the first specific collection method being drive test measurement;

access a third set and a fourth set of data values for wireless providers of interest from a second datasources, different from the first datasource, where the third set of data values indicate a second measure of the first aspect of network performance and the fourth set of data values indicate a second measure of the second aspect of network performance, where the second datasource measures the first aspect of the network performance using a second specific collection method different than the first specific collection method;

generate a first metric from the first set of data values, a second metric from the second set of data values, a third metric from the third set of data values and a fourth metric from the fourth set of data values;

generate a first indexed metric for the first metric using the first set of data values;

generate a second indexed metric for the second metric using the second set of data values;

generate a third indexed metric for the third metric using the third set of data values;

generate a fourth indexed metric for the fourth metric using the fourth set of data values;

generate a cross datasource index for the first aspect of network performance by combining the first indexed metric with the third indexed metric;

generating a cross datasource index for the second aspect of network performance by combining the second indexed metric with the fourth indexed metric;

weight the cross datasource indexes for the first and second aspects of network performance;

generate an overall performance index for respective ones of the wireless providers of interest by combining the weighted cross datasource index for the first aspect of network performance with the weighted cross datasource index for the second aspect of network performance; and generate a report showing the overall performance index for the respective ones of the wireless providers of interest, where the report identifies the relative performance between the wireless providers of interest and prioritizes elements of the network that need the most improvement.

26. The storage medium as defined in claim 25, wherein the first metric is a data metric or a voice metric.

27. The storage medium as defined in claim 26, wherein the data metric includes at least one of a data accessibility metric, a data retainability metric, a data throughput metric, a passive data coverage metric or an active data coverage metric.

28. The storage medium of claim 25, wherein the first datasource is a Nielsen Drive Test (NDT) Datasource and the second datasource is a Nielsen Mobile Performance Datasource.

29. The storage medium as defined in claim 25, wherein the first indexed metric is generated by:

calculating a mean of the first set of data values;

calculating a standard deviation of the first set of data values;

subtracting the mean from the first metric to obtain a difference;

dividing 20 by the standard deviation to obtain a quotient;

multiplying the difference by the quotient to obtain a product;

adding 100 to the product.

30. The storage medium of claim 25, wherein the second specific collection method includes mobile performance measurements.

\* \* \* \* \*